B. F. LAMBERT.
POWER TRANSMISSION MECHANISM.
APPLICATION FILED DEC. 20, 1909.
1,008,831.
Patented Nov. 14, 1911.
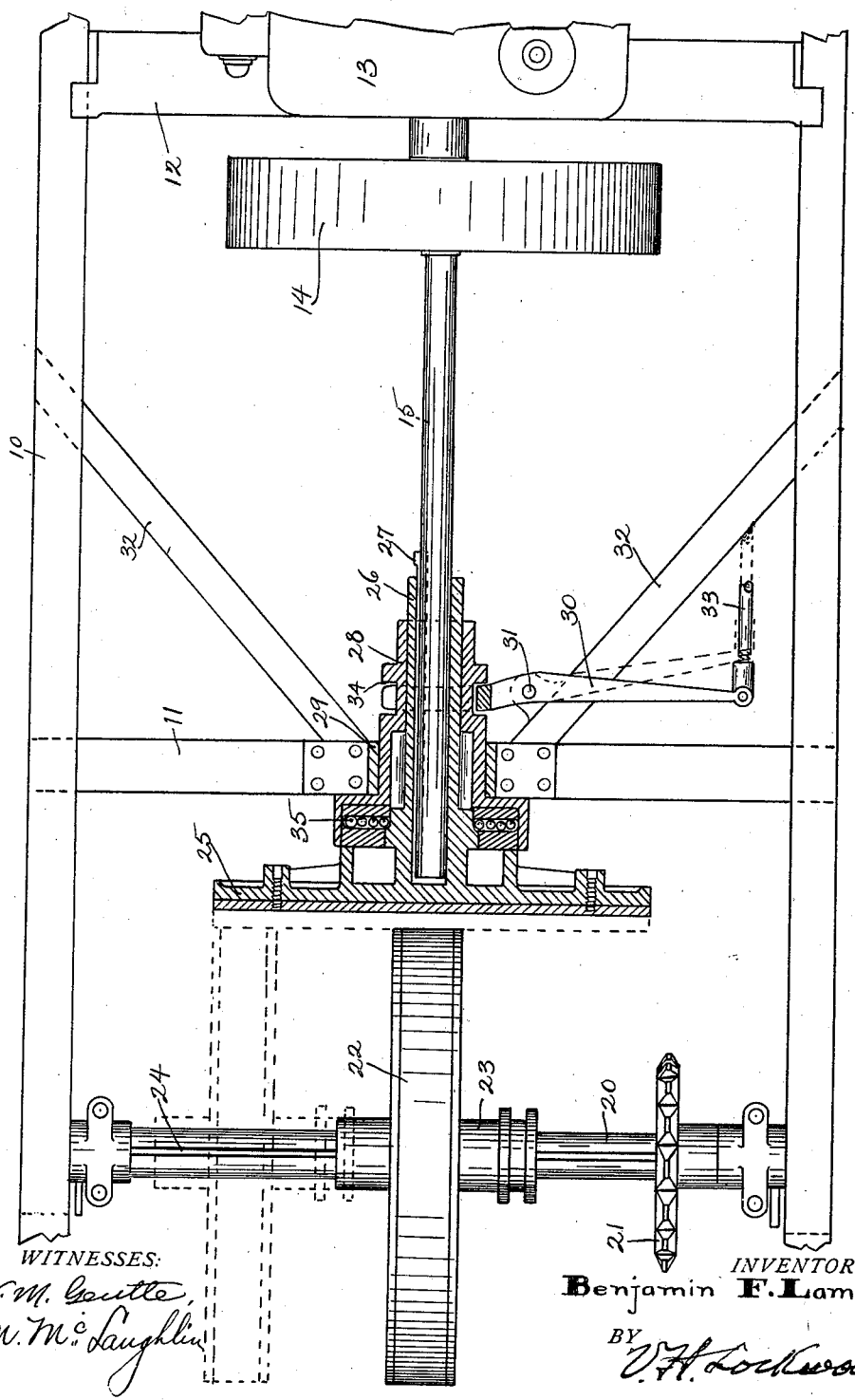
WITNESSES:
W. M. Goutte
O. M. McLaughlin
INVENTOR.
Benjamin F. Lambert.
BY V. H. Lockwood
ATTORNEY.

UNITED STATES PATENT OFFICE.

BENJAMAN F. LAMBERT, OF ANDERSON, INDIANA, ASSIGNOR TO THE BUCKEYE MANUFACTURING COMPANY, OF ANDERSON, INDIANA, A CORPORATION.

POWER-TRANSMISSION MECHANISM.

1,008,831.             Specification of Letters Patent.     Patented Nov. 14, 1911.

Application filed December 20, 1909. Serial No. 534,039.

*To all whom it may concern:*

Be it known that I, BENJAMAN F. LAMBERT, of Anderson, county of Madison, and State of Indiana, have invented a certain new and useful Power-Transmission Mechanism; and I do hereby declare that the following is a full, clear, and exact description thereof, reference being had to the accompanying drawings.

The object of this invention is to improve the construction of power transmission mechanism, particularly in connection with friction driving mechanism wherein one friction wheel or disk must be moved facewise toward or from the periphery of a companion friction wheel or disk.

This invention has been made with particular reference to use in automobiles.

Heretofore it has been customary to mount the driving friction wheel or disk rigidly on a longitudinally slidable shaft and to provide a connection between said shaft and the power mechanism whereby such shaft could have longitudinal movement. This arrangement has a disadvantage arising from the flexible or yielding connection between the said shaft and the power mechanism or fly wheel.

The chief feature of this invention consists in arranging the shaft which carries the driving friction disk or wheel so it can have no longitudinal movement or play whatever, and, hence, is rigidly connected with the power mechanism or fly wheel. Therefore, there will be no weakened connection between the fly wheel and the shaft, nor any intervening means for interfering in any wise with the complete transmission of the power from the fly wheel to the shaft.

The invention lies also in mounting the driving friction wheel or disk rigidly on a sleeve or hub that is slidable upon said shaft but is splined therewith so that the rotary movement of the shaft will be transmitted from said sleeve or hub to the driving friction wheel or disk. Means are provided for giving longitudinal movement to said sliding sleeve or hub, thus enabling the driving disk or wheel to be moved toward or away from the driven friction disk or wheel.

The nature of the invention will be understood from the accompanying drawings and the following description and claims.

The drawing is a plan view of a portion of the chassis of an automobile with the end portions broken away and with parts shown in horizontal section and the different positions of the friction wheels indicated by dotted lines.

There is shown herein a frame including side bars 10, a cross bar 11 and a front plate 12 on which the engine 13 is mounted which drives the fly wheel 14, and with which the shaft 15 is rigidly secured. At the other end of the frame there is a driven shaft 20 from which power is transmitted through the sprocket wheel 21 to the traction wheels of the automobile or other means to be driven, and on it the driven friction wheel or disk 22 is mounted by means of the sliding hub 23 on the shaft 20, and which is splined therewith by the spline or key 24, whereby the wheel or disk 22 may be slid laterally so as to bring its periphery into any desired relation with the face of the driving friction wheel or disk 25.

The driving friction wheel or disk 25 is rigidly secured to a hub-like casing or sleeve 26 that is slidably mounted on the shaft 15 and is splined therewith by the key or spline 27, so that said hub or casing may be slid longitudinally of said shaft 15 in order to bring the disk 25 into contact with the disk 22 or to separate the same. The hub or casing 26 is mounted in a cylindrical bearing 28 that in turn is mounted in a bearing 29 secured upon the cross bar 11. The tubular bearing 28 is slidable in the fixed bearing 29 longitudinally of the shaft 15 by means of the lever 30, which is fulcrumed at 31 to one of the braces 32 of the frame, and is actuated by a rod 33 that extends to some convenient place for manipulation. The lever 30 has a yoke on its inner end which fits in a peripheral groove 34 in said sliding bearing 28. There is a ball thrust bearing 35 located between the enlarged end of the bearing 28 and the driving friction disk.

What I claim as my invention and desire to secure by Letters Patent is:

1. Power transmission mechanism including a driving shaft, a driving friction wheel arranged transversely of the shaft and slidable thereon and provided with a hub like casing at one side thereof and mounted on said shaft so as to be slidable longitudinally thereof and receive rotary movement therefrom, a friction wheel adapted to be engaged and driven by said driving friction wheel, a tubular bearing for said hub like casing and arranged so that when moved longitudinally it will cause longitudinal movement of said wheel and casing toward said driven friction wheel, a fixed bearing for said tubular bearing and through which said tubular bearing is slidable, and a lever engaging said slidable bearing for moving the same in either direction longitudinally of the shaft.

2. Power transmission mechanism including a driving shaft, a driving friction wheel arranged transversely of the shaft and beyond one end thereof and provided with a hub-like casing mounted on said shaft so as to be slidable longitudinally thereof and receive rotary movement therefrom, a fixed bearing, a tubular bearing slidable in said fixed bearing and surrounding said hub-like casing, thrust bearings between said friction wheel and said tubular bearing, a friction wheel adapted to be engaged and driven by said driving friction wheel, and a lever engaging said slidable bearing for moving said hub-like casing and driving friction wheel longitudinally of said shaft into engagement with the driven wheel.

In witness whereof, I have hereunto affixed my signature in the presence of the witnesses herein named.

BENJAMAN F. LAMBERT.

Witnesses:
GEO. A. LAMBERT,
A. S. McGRANAHAN.

Copies of this patent may be obtained for five cents each, by addressing the "Commissioner of Patents, Washington, D. C."